United States Patent [19]

Yamaguchi

[11] Patent Number: 4,958,495
[45] Date of Patent: Sep. 25, 1990

[54] HYDRAULIC DIFFERENTIAL CYLINDER

[75] Inventor: Kouji Yamaguchi, Saitama, Japan

[73] Assignee: Honda Giken Kogyo Kabushiki Kaisha, Tokyo, Japan

[21] Appl. No.: 267,078

[22] Filed: Nov. 4, 1988

[30] Foreign Application Priority Data

Nov. 5, 1987 [JP] Japan .............. 62-169360[U]

[51] Int. Cl.⁵ .......................................... F15B 13/042
[52] U.S. Cl. ............................................ 60/468; 91/49; 91/417 R; 91/420; 91/422
[58] Field of Search ............... 60/443, 468; 91/34, 91/47, 49, 415, 417 R, 420, 165, 422

[56] References Cited

U.S. PATENT DOCUMENTS

| | | | |
|---|---|---|---|
| 3,065,700 | 11/1962 | Blenkle | 60/487 X |
| 3,143,858 | 8/1964 | Roeske | 60/468 |
| 3,238,723 | 3/1966 | Young | 60/444 |
| 4,089,252 | 5/1978 | Patel et al. | 91/376 R X |
| 4,187,877 | 2/1980 | Hodgson et al. | 137/596 |
| 4,256,017 | 3/1981 | Eastman | 91/417 R |
| 4,436,489 | 3/1984 | Zangenberg | 60/443 X |
| 4,444,093 | 4/1984 | Koga et al. | 91/488 |
| 4,682,519 | 7/1987 | Okaka et al. | 74/868 |
| 4,699,571 | 10/1987 | Bartholomaus | 417/213 |
| 4,716,791 | 1/1988 | Ohzono et al. | 74/867 |
| 4,729,263 | 3/1988 | Hopff et al. | 74/867 |

FOREIGN PATENT DOCUMENTS

| | | | |
|---|---|---|---|
| 88460 | 8/1978 | Japan | 60/443 |
| 2881 | 1/1980 | Japan | 60/443 |
| 95722 | 8/1981 | Japan | . |
| 207229 | 9/1986 | Japan | . |

Primary Examiner—Edward K. Look
Assistant Examiner—George Kapsalas
Attorney, Agent, or Firm—Lyon & Lyon

[57] ABSTRACT

A hydraulic differential cylinder comprises a cylinder, a piston slidably fitted in a cylinder chamber, a piston rod with one end coupled to said piston and an inner valve disposed in said piston rod. The cylinder chamber is divided by the piston into a rod-side cylinder chamber and a head-side cylinder chamber. The piston-pressure-bearing area of the head-side cylinder chamber is greater than the piston-pressure-bearing area of the rod-side cylinder chamber. The rod-side cylinder chamber is connected via the inner valve to a constant hydraulic pressure source. The head-side cylinder chamber is connected to a control hydraulic pressure source. The inner valve has means for communicating the constanbt hydraulic pressure source with the rod-side cylinder chamber when the hydraulic pressure of the working fluid supplied from the control hydraulic pressure source to the head-side cylinder chamber is lower than a critical hydraulic pressure, and for shutting off the communication between the constant hydraulic pressure source and the rod-side cylinder chamber and for communicating the rod-side cylinder chamber with a drain when the hydraulic pressure of the working fluid supplied from the control hydraulic pressure source to the head-side cylinder chamber is higher than the critical hydraulic pressure.

12 Claims, 5 Drawing Sheets

HYDRAULIC DIFFERENTIAL CYLINDER

BACKGROUND OF THE INVENTION

The present invention relates to a differential cylinder having a cylinder and a piston and operable to move the piston under hydraulic forces.

There are known hydaulic differential cylinders, used for servo control or the like, which comprise a cylinder, a piston slidably fitted in a cylinder chamber defined in the cylinder, and a piston rod having one end coupled to the piston and the other end projecting out of the cylinder, the piston and the piston rod being movable by supplying hydraulic pressure into the cylinder chamber divided by the piston.

For example, such a differential cylinder may be employed as a servo cylinder for controlling clutch operation and speed reduction ratio of a hydraulically operated continuously variable speed transmission.

The proposed differential cylinder comprises, an shown in FIG. 5 of the accompanying drawings, a cylinder 51, a piston 52 slidably fitted in a cylinder chamber defined in the cylinder 51, and a piston rod 53 coupled to the piston 52 and projecting out of the cylinder 51. The cylinder chamber is divided by the piston 52 into a righthand rod-side cylinder chamber 55 and a lefthand head-side cylinder chamber 54. The rod-side cylinder chamber 55 is supplied with working fluid under constant hydraulic pressure Pc from a hydraulic pressure supply source 56 through a hydraulic line 61. The head-side cylinder chamber 54 is supplied with working fluid through a hydraulic line 62 under control hydraulic pressure Ps which is produced by reducing the hydraulic pressure Pc from the hydraulic pressure supply source 56 with two duty-ratio controlling solenoid valves 57, 58. The head-side cylinder chamber 54 has a piston-pressure-bearing area Ah of the rod-side cylinder chamber 55. Therefore, the piston 52 and the piston rod 53 can be moved horizontally by varying the control hydraulic pressure Ps acting in the head-side cylinder chamber 54 in a pressure range which is lower than the constant hydraulic pressure Pc.

With the differential cylinder of the above structure, the maximum value of a force Fl for pushing the piston 52 to the left when the control hydraulic pressure Ps is zero is given by:

$$Flmax = \pi/4(A^2 - B^2) * Pc$$

(where an asterisk, or * mark, represents a multiplication)
whereas the maximum value of a force Fr for pushing the piston 52 to the right is produced when the control hydraulic pressure Ps is equal to the constant hydraulic pressure Pc, and is given by:

$$Frmax = \pi/4 * B^{2*} Pc.$$

Therefore, in order to increase the rightward force Frmax to push the piston 52, the diameter B of the piston rod 53 has to be increased. If the diameter B is increased, however, the leftward force Flmax for pushing the piston is reduced. Consequently, the above differential cylinder cannot produce large forces to push the piston 52.

Various efforts have been made in the past to increase the piston pushing forces by increasing the cylinder diameter, or by employing a four-way valve to vary the hydraulic pressure supplied to the rod-side cylinder chamber 55. However, these proposals result in a large-size differential cylinder or a complex control system.

SUMMARY OF THE INVENTION

In view of the problems discussed above, it is an object of the present invention to provide a differential cylinder that can produce increased power without increasing the size thereof and without requiring an additional external device such as a four-way valve.

To achieve the above object, a differential cylinder of the present invention has a rod-side cylinder chamber connected through an inner valve to a constant hydraulic pressure source for supplying working fluid under a prescribed hydraulic pressure and a head-side cylinder chamber connected to a control hydraulic pressure source for supplying working fluid under a controlled hydraulic pressure which is lower than the prescribed hydraulic pressure. When the hydraulic pressure of the working fluid supplied from the control hydraulic pressure source through the inner valve to the head-side cylinder chamber is lower than a critical hydraulic pressure, the rod-side cylinder chamber is brought into communication with the hydraulic pressure source. When the hydraulic pressure supplied to the head-side cylinder chamber is higher than the critical hydraulic pressure, the communication between the hydraulic pressure source and the rod-side cylinder chamber is shut off, and the rod-side cylinder chamber is brought into communication with a drain.

For moving the piston toward the head thereof under the hydraulic pressure in the rod-side cylinder chamber, the control hydraulic pressure acting in the head-side cylinder chamber is lowered at least below the critical hydraulic pressure (e.g., down to substantially zero) to cause the inner valve to bring the rod-side cylinder chamber into communication with the hydraulic pressure source. With the working fluid supplied under the controlled hydraulic pressure to the rod-side cylinder chamber, the piston can be moved toward the head under a maximum force. Conversely, for moving the piston toward the piston rod under the controlled hydraulic pressure in the head-side cylinder chamber, the hydraulic pressure in the head-side cylinder chamber is increased higher than the critical hydraulic pressure to cause the inner valve to shut off the communication between the hydraulic pressure source and the rod-side cylinder chamber and also to bring the rod-side cylinder chamber into communication with the drain, so that the hydraulic pressure in the rod-side cylinder chamber drops to zero. Therefore, the hydraulic pressure of the working oil supplied to the head-side cylinder chamber is fully available to produce a force to move the piston toward the piston rod, and it becomes possible to increase such a force.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the scope of the present invention and wherein.

DESCRIPTION OF THE PREFERRED EMBODIMENT

Figure 1:
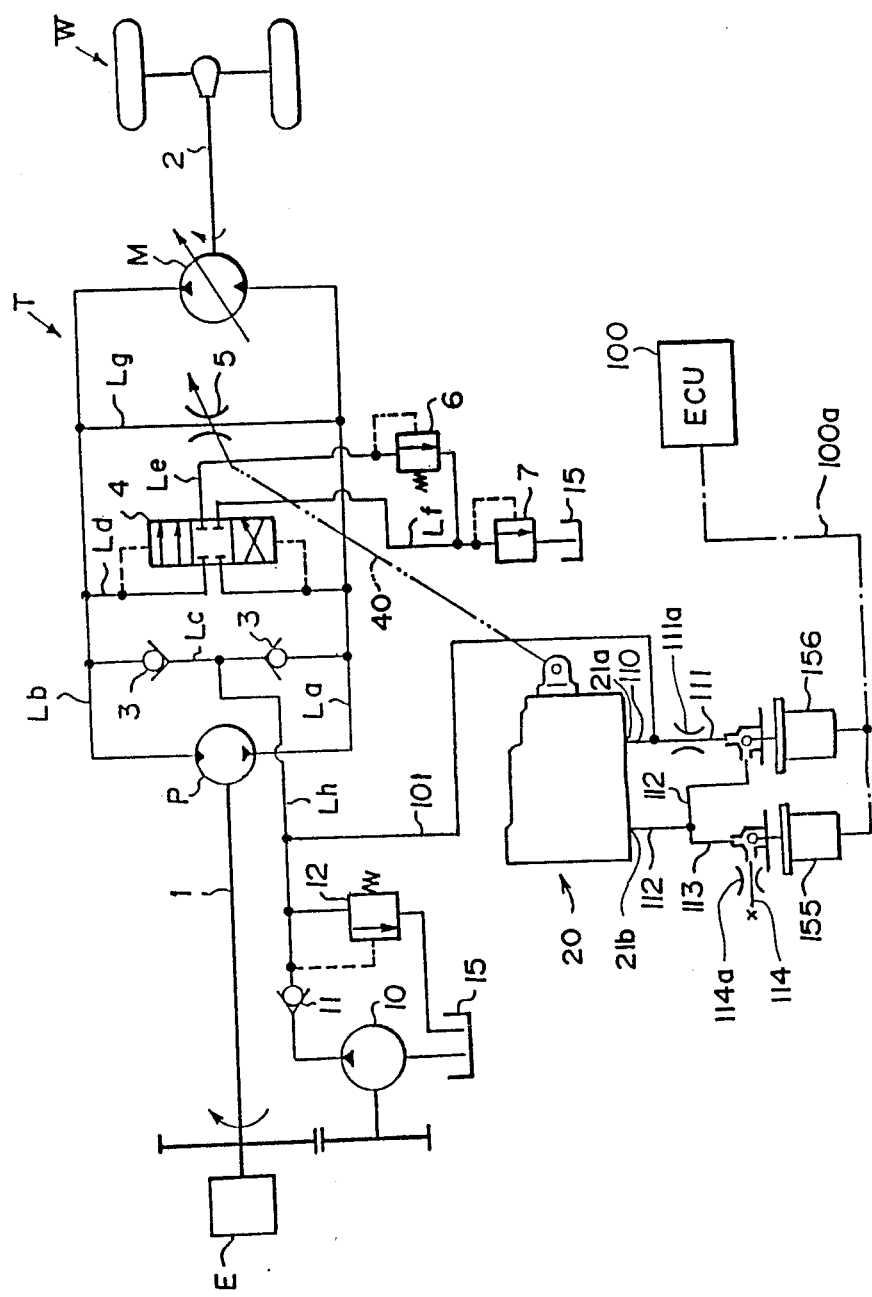
FIG. 1 is hydraulic circuit diagram of a continuously variable transmission which incorporates a differential cylinder according to the present invention for controlling the opening of a clutch valve.

A hydraulic circuit diagram of an continuously variable speed transmission with a clutch valve the opening of which is controlled by a differential cylinder of the present invention is presented in FIG. 1, wherein the continuously variable speed transmission T has a constant displacement swash plate type axial plunger hydraulic pump P driven by an engine E through an input shaft 1 and a variable displacement swash plate type axial plunger hydraulic motor M which drives wheels W through a directional change unit (not shown). The pump P and motor M are connected with each other by means of two hydraulic lines La and Lb composing a closed hydraulic circuit wherein the first line La connects the pump outlet port to the motor inlet port and the second line Lb connects the pump inlet port to the motor outlet port.

A charge pump 10 driven by the engine E is connected to the closed circuit through a charge hydraulic line Lh having a check valve 11 and through a third hydraulic line Lc having a pair of check valves 3. Hydraulic oil pumped up by the charge pump 10 from an oil sump 15 and regulated in its pressure by a charge pressure relief valve 12 is supplied to either of the two hydraulic lines La, Lb which has lower pressure through the check valve 3. A fourth hydraulic line Ld having a shuttle valve 4 is connected to the closed circuit. To the shuttle valve 4 is connected a fifth and a sixth hydraulic line Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference of the first and second hydraulic line La and Lb to shift to either of the extreme positions to communicate either of the first or second hydraulic lines La, Lb having higher pressure with the fifth hydraulic line Le as well as to communicate the other hydraulic line La or Lb having lower pressure with the sixth hydraulic line Lf. Therefore, the relief pressure of a higher pressure line is regulated by the high pressure relief valve 6, and the relief hydraulic pressure of the other, lower pressure line is regulated by the low pressure relief valve 7. When the pressures in hydraulic lines La and Lb are equal, the valve 4 is in the central position for closing the line Ld.

A seventh hydraulic line Lg is connected between the first and second hydraulic lines La, Lb to short-circuit them. The seventh hydraulic line Lg has a clutch valve 5 comprising a variable restrictor or flow metering valve for controlling the opening of the seventh hydraulic line Lg. The clutch valve 5 can control transmission of drive forces from the hydraulic pump P to the hydraulic motor M by controlling of the opening of the seventh hydraulic line Lg.

The hydraulic pump P is driven by the engine E, and the hydraulic motor M is driven by the hydraulic pressure produced by the hydraulic pump P. The rotation of the hydraulic motor M is transmitted through an output shaft 2 to wheels W for thereby driving the wheels W. The hydraulic motor M comprises a swash plate-type axial piston motor, for example. The transmission ratio of the transmission T can thus be continuously varied by controlling the inclination angle of the swash plate of the hydraulic motor M. Since the control of the swash plate is well known in the art, it will not be described in detail below.

Operation of the clutch valve 5 is controlled by a clutch servo valve 20 comprising a differential cylinder according to the present invention. The clutch servo valve 20 is controlled in its operation by a pair of solenoid valves 155, 156 with their duty ratios being controlled by signals from a controller 100. The controller 100 is supplied with signals indicating a vehicle speed V, an engine rotational speed Ne, a throttle valve opening $\theta$th, an angle $\theta$tr of inclination of the swash plate of the hydraulic motor M, and a clutch valve opening $\theta$cl. Based on these signals, the controller 100 applies signals to control the solenoid valves 155, 156 for controlling the vehicle to run as desired.

The structure and operation of the clutch servo valve 20 will hereinafter be described in detail with reference to FIGS. 2 through 4.

The clutch servo valve 20 comprises a cylinder 21, a piston 23 horizontally (as shown) slidably fitted in the cylinder 21, a piston rod 30 having a lefthand end integrally joined to the piston 23 and a righthand end projecting out of the cylinder 21, a cover 22 attached to the cylinder 21 in covering relation to a cylinder chamber in which the piston 23 is slidably fitted, and an inner valve spool 35 slidably fitted in a valve insertion space 31 defined horizontally in the piston rod 30. The cylinder chamber is divided by the piston 23 into a head-side cylinder chamber 27 into which a piston head surface 23a of the piston 23 faces and a rod-side cylinder chamber 28 in which the piston rod 30 is inserted. The piston rod 23 is normally urged to move to the left by a larger spring 25 disposed in the rod-side cylinder chamber 28, and the inner valve spool 35 is normally urged to move to the left by a smaller spring 36.

The valve insertion space 31 has a first insertion hole 31a having a diameter c and a second insertion hole 31b having a diameter d (c>d). The inner valve spool 35 slidably inserted in the valve insertion space 31 has a first land 35a having a diameter substantially equal to the diameter c and a second land 35b having a diameter substantially equal to the diameter d. The first land 35a is fitted in the first insertion hole 31a and the second land 35b is fitted in the second insertion hole 31b. The inner valve spool 35 is horizontally movable in the insertion hole 31.

The valve insertion space 31 is held in communication at its righthand end with a drain (oil sump) through a passage 31c and at its lefthand end with the head-side cylinder chamber 27. The valve spool 35 fitted in the valve insertion space 31 is subjected at its lefthand end to hydraulic pressure in the head-side cylinder 27 and at its righthand end to no hydraulic pressure. The step between the first and second lands 35a, 35b is subjected to hydraulic pressure in the rod-side cylinder chamber 28 which acts in the leftward direction. When the hydraulic pressure in the head-side cylinder chamber 27 acting on the lefthand end of the valve spool 35 exceeds a hydraulic pressure level (referred to as a "critical hydraulic pressure Pt") which counterbalances the sum of the resilient force of the smaller spring 36 that biases the spool 35 to the left and the hydraulic pressure acting on the step between the first and second lands 35a, 35b, the valve spool 35 is moved to the right against the resiliency of the smaller spring 36. When the hydraulic pressure in the head-side cylinder chamber 27 is lower than the critical hydraulic pressure Pt, the valve spool 35 is moved to the left and held in position with the lefthand end thereof abutting against a stop ring 32.

The righthand end of the piston rod 30 which projects out of the cylinder 21 is coupled to the clutch valve 5 through a link 40. Horizontal movement of the piston 23 and the piston rod 30 is transmitted via the link 40 to the clutch valve 5 for opening or closing the clutch valve 5. In the illustrated embodiment, when the piston rod 30 is moved a maximum stroke to the left, the clutch valve 5 is fully opened. As the piston rod 30 is moved to the right, the clutch valve 5 is closed, and when the piston rod 30 is moved a maximum stroke to the right, the clutch valve 30 is fully closed.

The horizontal movement of the piston rod 30 is effected by the hydraulic pressure of working oil supplied to the cylinder chambers 27, 28 through supply passages 21b, 21a defined in the cylinder 21. The righthand supply passage 21a is connected to the rod-side cylinder chamber 28 through the inner valve spool 35, and the lefthand supply passage 21b cummunicates directly with the head-side cylinder chamber 27. The supply passages 21a, 21b are connected respectively to hydraulic lines 110, 112.

The hydraulic pressure in the hydraulic line 110 is a charging pressure Pc which is produced by regulating the discharged hydraulic pressure from the charging pump 10 with the charging pressure relief valve 12 and supplied through a hydraulic line 101. The hydraulic pressure in the hydraulic line 112 is hydraulic pressure which is produced by controlling the hydraulic pressure in a hydraulic line 111 branched from the hydraulic line 101 and having an orifice 111a, with the solenoid valves 155, 156 having controllable duty ratios. The solenoid valve 156 is openable and closable dependent on its controlled duty ratio to control the rate of flow of the working oil from the hydraulic line 111 to the hydraulic line 112. The solenoid valve 155 is disposed between a hydraulic line 113 branched from the hydraulic line 112 and a hydraulic line 114 communicating with the drain through an orifice 114a, and serves to allow the controlled flow of the working oil from the hydraulic line 113 to the drain dependent on the controlled duty ratio thereof.

The righthand supply passage 21a is thus applied via the hydraulic line 110 with the charging pressure Pc (which is of a constant level) regulated by the charging pressure relief valve 12. From the hydraulic line 112, the working oil of a control hydraulic pressure Ps which is made lower than the charging pressure Pc by the two solenoid valves 155, 156 is supplied to the lefthand supply passage 21b.

Operation of the servo valve 20 through the control of the control pressure Ps with the solenoid valves 155, 156 will be described below.

Figure 2:
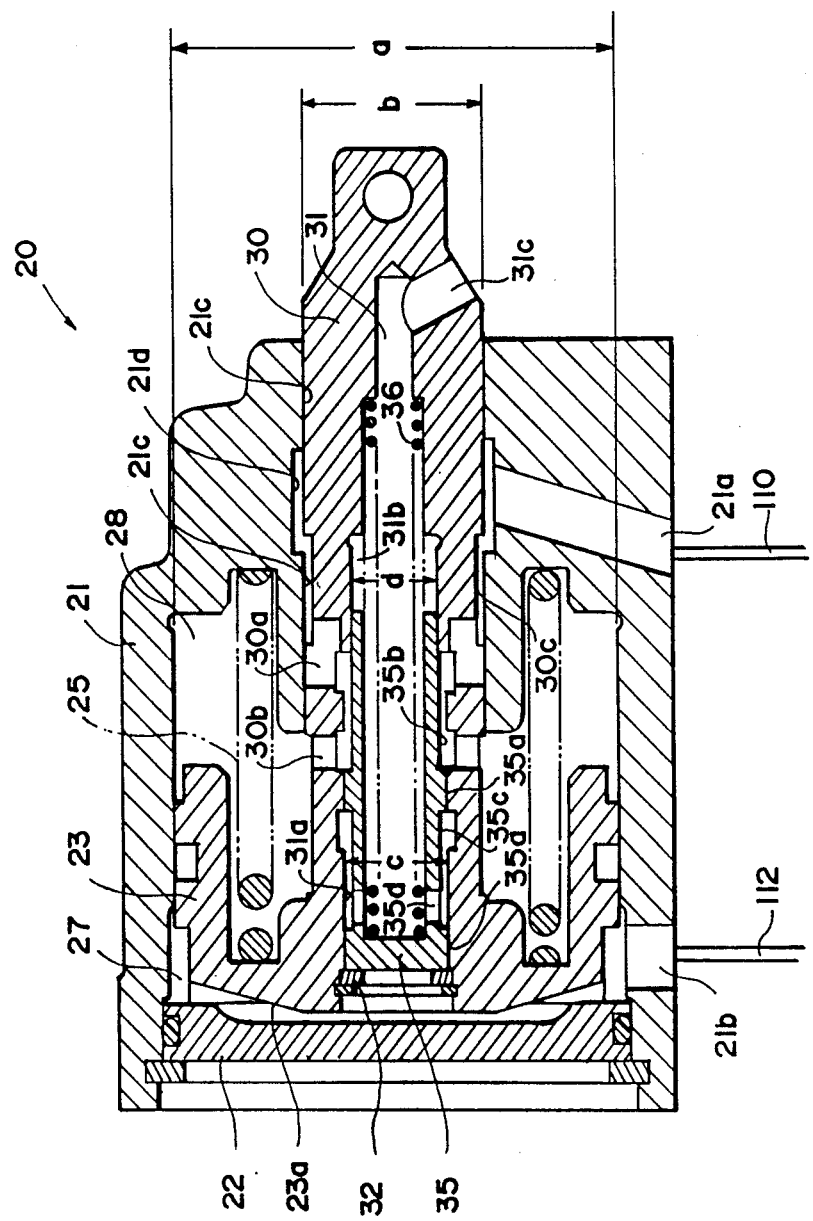
FIGS. 2 through 4 are cross-sectional views of the differential cylinder of the present invention.

When the control hydraulic pressure Ps supplied to the head-side cylinder 27 is lower than the critical hydraulic pressure Pt, the inner valve spool 35 is moved to the left under the bias of the smaller spring 36 and positioned as shown in FIG. 2. Therefore, the working oil under the charging pressure Pc which is supplied from the hydraulic line 110 to the righthand supply passage 21a is delivered into the rod-side cylinder chamber 28 through a groove 30c defined in the outer circumferential surface of the piston rod 30 and two communciation holes 30a, 30b defined radially through the piston rod 30 from the outer circumferential surface into the valve insertion space 31. At this time, the piston 23 and the piston rod 30 are moved to the left under the force represented by:

$$F_1 = \pi/4(a^2 - b^2) * Pc - \pi/4 * a^2 * Ps + Fspr$$

where
  a: the diameter of the piston 23,
  b: the diameter of the piston rod 30 and
  Fspr: the resilient force of the larger spring 25.

Finally, the piston 23 abuts against the cover 22 whereupon the clutch 5 is fully opened.

Figure 3:
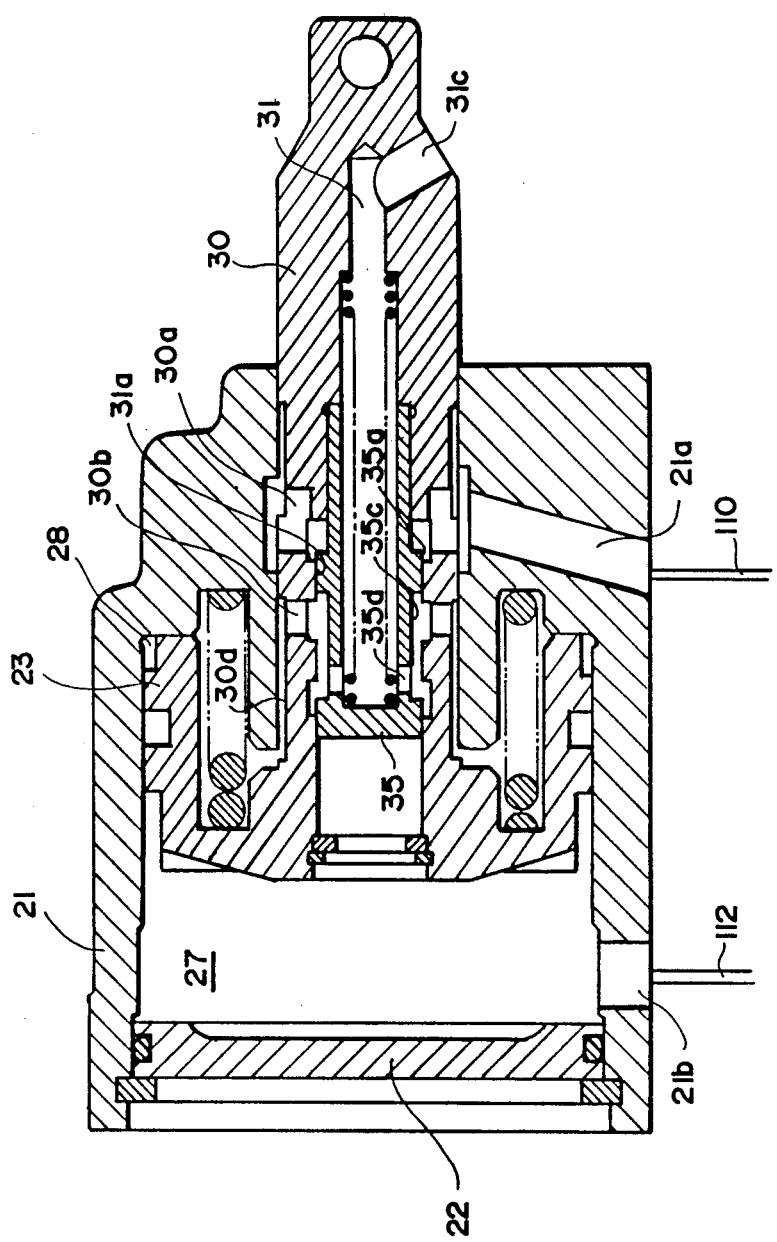
Figure 4:
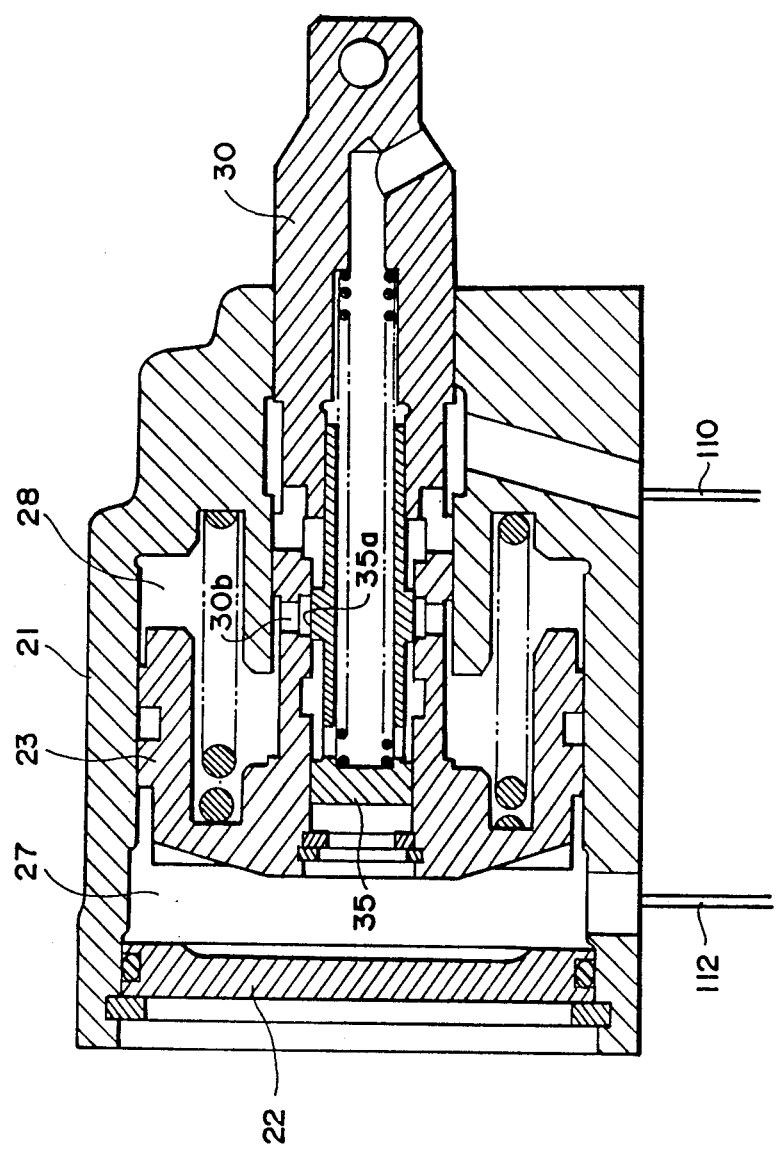
Figure 5:
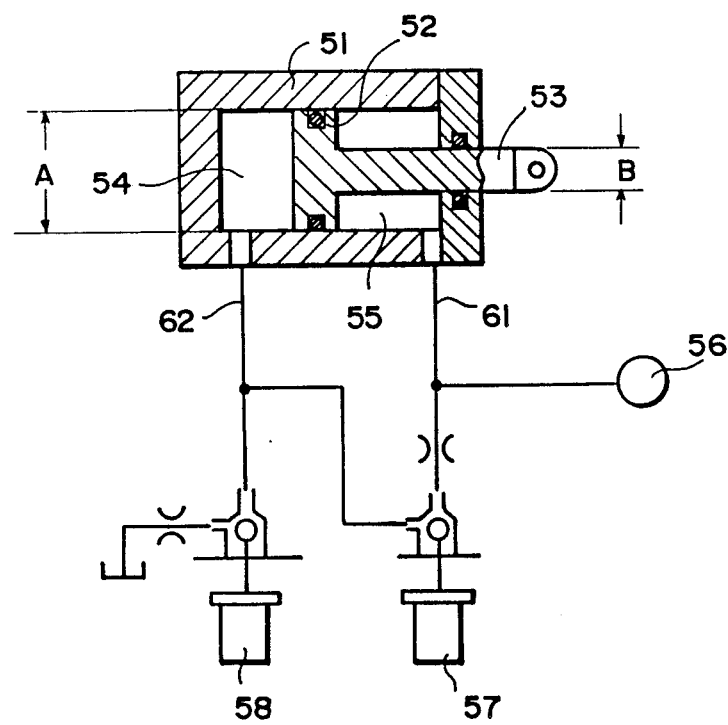
FIG. 5 is a cross-sectional view of a conventional differential cylinder.

When the control hydraulic pressure Ps supplied to the head-side cylinder chamber 27 is higher than the critical hydraulic pressure Pt, the inner valve spool 35 is moved to the right and positioned relatively to the piston rod 30 as illustrated in FIG. 3. At this time, the first land 35a of the valve spool 35 is fitted in the first insertion hole 31a in the piston rod 30 between the communication holes 30a, 30b, thus shutting off the communication between the communication holes 30a, 30b. Therefore, the charging pressure Pc supplied from the hydraulic line 110 via the righthand supply passage 21a to the communication hole 30b is stopped by the first land 35a.

The communication hole 30b is in communication with the valve insertion space 31 through a groove 35c defined in the first land 35a of the valve spool 35 and an opening 35d defined through the valve spool 35 at the groove 35c. The communication hole 30b also communicates with the rod-side cylinder chamber 28 through a groove 30d defined in the outer circumferential surface of the piston rod 30. Consequently, the working oil in the rod-side cylinder chamber 28 is discharged to the drain (oil sump), so that the hydraulic pressure in the rod-side cylinder chamber 28 is substantially zero.

At this time, the piston 23 and the piston rod 30 is moved to the right under a force expressed by:

$$F_2 = \pi/4 * a^2 * Ps$$

until finally the piston 23 abuts against the righthand end of the cylinder 21 as shown in FIG. 3, whereupon the clutch valve 5 is fully closed.

As described above, the movement of the piston 23 and the piston rod 30 can be controlled by controlling the control hydraulic pressure Ps supplied to the head-side cylinder chamber 27. While the piston 23 and the piston rod 30 are in motion, and when the control hydraulic pressure Ps is equalized to the critical hydraulic pressure Pt to hold the inner valve spool 35 in its stroke of movement, thereby closing the communication hole 30b with the first land 35a, the working oil is confined in the rod-side cylinder chamber 28. (FIG. 4) The piston 23 and the piston rod 30 can thus be kept still a desired position, and the clutch valve 5 can be set to a desired opening.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic differential cylinder comprising a cylinder, a piston slidably fitted in a cylinder chamber defined in said cylinder, a piston rod with two ends, one end of the piston rod being coupled to said piston and the other end of the piston rod projecting out of said cylinder, and an inner valve disposed in said piston rod, said cylinder chamber being divided by said piston into a rod-side cylinder chamber in which said piston rod is disposed and a head-side cylinder chamber into which a piston head surface of said piston faces, said rod-side cylinder chamber being connected via said inner valve to a constant hydraulic pressure source for supplying working fluid of a substantially constant pressure, said head-side cylinder chamber being connected to a contol hydraulic pressure source for supplying working fluid of a controlled pressure which is lower than said constant pressure, said inner valve being actuated based on a hydraulic pressure in said head-side cylinder chamber, wherein, said inner valve is opened to connect said constant hydraulic pressure source to said rod-side cylinder chamber when the controlled pressure supplied in said head-side cylinder chamber is lower than a critical hydraulic pressure, and said inner valve is closed to shut off the supply of fluid from said constant hydraulic pressure source to said rod-side cylinder chamber and to connect said rod-side cylinder chamber with a drain when the controlled pressure supplied in said head-side cylinder chamber is higher than said critical hydraulic pressure.

2. A hydraulic differential cylinder as defined in claim 1, wherein a clutch valve for controlling an opening of a bypass line in hydraulic continuously variable speed transmission is operationally controlled by said hydraulic differential cylinder, said transmission comprising a hydraulic pump and a hydraulic motor, at least one of which is of variable displacement type, said bypass line connecting a hydraulic line disposed between an outlet of said pump and an inlet of said motor with a hydraulic line disposed between an inlet of said pump and an outlet of said motor.

3. A hydraulic differential cylinder as defined in claim 2, wherein said constant hydraulic pressure source includes a charge pressure relief valve which regulates the pressure of charging fluid supplied to said hydraulic continuously variable speed transmission.

4. A hydraulic differential cylinder as defined in claim 1, wherein said constant hydraulic pressure source includes a pressure relief valve.

5. A hydraulic differential cylinder as defined in claim 1, wherein said control hydraulic pressure source includes two duty-ratio controlled solenoid valves which control the pressure of fluid supplied to said head-side cylinder chamber.

6. A hydraulic differential cylinder as defined in claim 1, wherein a spring means is disposed in said rod-side cylinder chamber for pushing said piston toward said head-side cylinder chamber.

7. A hydraulic differential cylinder as defined in claim 1, wherein said inner valve comprises a valve insertion hole defined in said piston rod, one end of said hole opening to said head-side cylinder chamber and the other end of said hole communicating with said drain, a valve spool slidably fitted in said valve insertion hole from said one end, a spring which pushes said valve spool toward said one end, and a stop ring which abuts against said valve spool when said valve spool is moved to a furthest position toward said one end.

8. A hydraulic differential cylinder as defined in claim 7, wherein two holes which respectively connect to said constant hydraulic pressure source and said rod-side cylinder chamber are defined in said piston rod, said two holes are connected to each other by said valve spool when said valve spool is moved to the furthest position toward said one end, and the one of said holes communicating with said constant hydraulic pressure source is blocked and the other of said holes communicating with said rod-side cylinder chamber is connected to said drain by said valve spool when said valve spool is moved to a second position which is toward said other end.

9. A hydraulic differential cylinder as defined in claim 8, wherein said valve spool has a head-side pressure bearing area on which the controlled pressure in the head-side cylinder chamber acts and a rod-side pressure bearing area on which the constant pressure from the constant hydraulic pressure source acts, the head-side pressure bearing area being greater than the rod-side pressure bearing area, said valve spool is pushed toward said other end by hydraulic pressure applied on said head-side pressure bearing area, and said valve spool is pushed toward said one end by hydraulic pressure applied on said rod-side pressure bearing area.

10. A hydraulic differential cylinder as defined in claim 9, wherein said valve spool is moved toward said other end when said hydraulic pressure applied on said head-side pressure bearing area is higher than said critical hydraulic pressure, and said valve spool is moved toward said one end when said hydraulic pressure applied on said head-side pressure bearing area is lower than said critical hydraulic pressure.

11. A hydralic differential cylinder apparatus, comprising a cylinder, a piston slidably fitted in a cylinder chamber defined in said cylinder, a piston rod with two ends, one end of the piston rod being coupled to said piton and the other end of the piston rod projecting out of said cylinder, said cylinder chamber being divided by said piston into a rod-side cylinder chamber in which said piston rod is disposed and a head-side cylinder chamber into which a piston head surface of said piston faces, a constant hydraulic pressure source means for supplying working fluid of a substantially constant pressure to said rod-side cylinder chamber, a control hydraulic pressure source means for supplying working fluid of a controlled pressure which is lower than said constant pressure to said head-side cylinder chamber, and inner valve means for selectively connecting said rod-side cylinder chamber to either of said constant hydraulic pressure source means and a drain, dependent upon the pressure level of said controlled pressure supplied to said head-side cylinder chamber.

12. A hydraulic differential cylinder apparatus according to claim 11, said inner valve means being actuated based on a hydraulic pressure in said head-side cylinder chamber in such a manner as to be opened to connect said constant hydraulic pressure source to said rod-side cylinder chamber when the controlled pressure supplied in said head-side cylinder chamber is lower than a critical hydraulic pressure, and said inner valve means is closed to shut off the supply of fluid from said constant hydraulic pressure source to said rod-side cylinder chamber and to connect said rod-side cylinder chamber to said drain when the controlled pressure supplied in said head-side cylinder chamber is higher than said critical hydraulic pressure.

* * * * *